A. R. DODGE.
FLOW METER.
APPLICATION FILED JUNE 22, 1916.

1,266,428.

Patented May 14, 1918.

Inventor:
Austin R. Dodge,
by Albert G. Davis
His Attorney.

UNITED STATES PATENT OFFICE.

AUSTIN R. DODGE, OF SCHENECTADY, NEW YORK, ASSIGNOR TO GENERAL ELECTRIC COMPANY, A CORPORATION OF NEW YORK.

FLOW-METER.

1,266,428.

Specification of Letters Patent.

Patented May 14, 1918.

Application filed June 22, 1916. Serial No. 105,283.

*To all whom it may concern:*

Be it known that I, AUSTIN R. DODGE, a citizen of the United States, residing at Schenectady, county of Schenectady, State of New York, have invented certain new and useful Improvements in Flow-Meters, of which the following is a specification.

The present invention relates to flow meters for measuring the flow of fluids through conduits of the type employing a Venturi tube for creating a pressure difference which bears a definite relation to the rate of flow.

The object of my invention is to provide an improved structure of Venturi tube which can be built at relatively low cost, which can be quickly and easily installed in existing pipe lines, and which does not require the substitution into the pipe line of a new pipe section, or the drilling of any holes in it.

Briefly my invention comprises a novel form of Venturi tube, which I term a flow tube, which may be inserted inside a pipe line, positioned, and connected up with a manometer by simply removing adjacent sections of the pipe line, inserting the flow tube into place, and replacing the sections again.

For a consideration of what I believe to be novel and my invention, attention is directed to the accompanying specification and the claims appended thereto.

Figure 1:
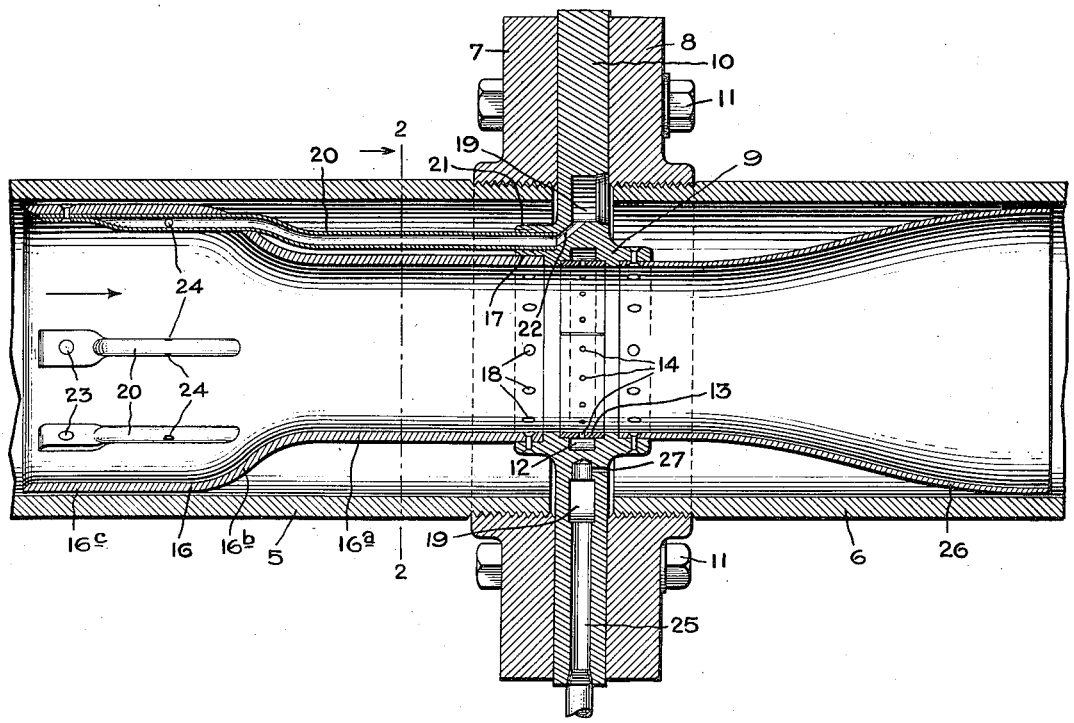
Figure 2:
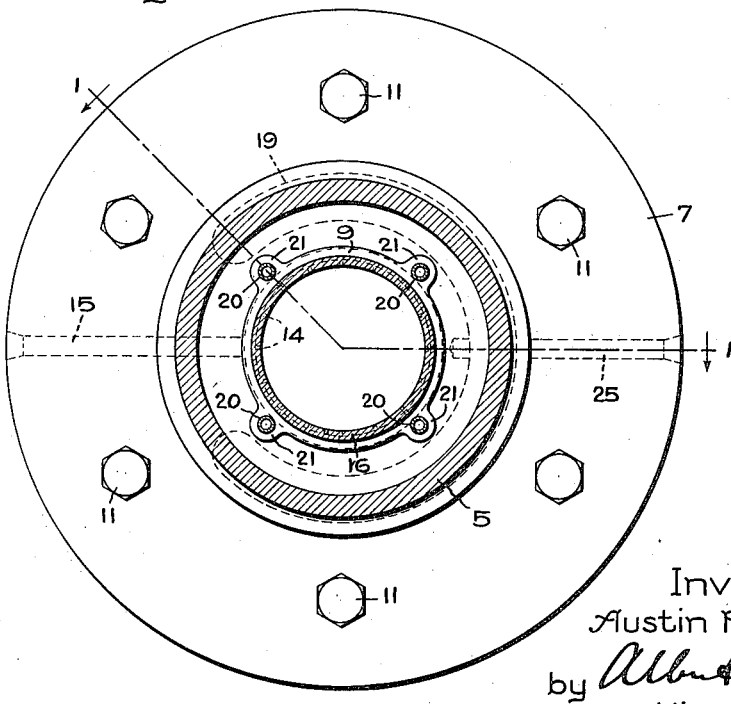

In the accompanying drawing wherein I have illustrated one form which my invention may take, Figure 1 is a sectional view taken on line 1—1, Fig. 2, showing a portion of a pipe line with my improved flow tube therein, and Fig. 2 is a sectional view taken on line 2—2, Fig. 1.

Referring to the drawings, 5 and 6 indicate adjacent ends of two pipe sections of a conduit in connection with which my apparatus is illustrated. The ends of the sections are threaded to receive coupling members 7 and 8. The flow tube comprises a hub 9 of somewhat smaller diameter than the conduit in which it is to be used, surrounded by an annular flange 10 which is preferably formed integral with the hub and which fits between the coupling members 7 and 8 and is held in place by suitable bolts 11. The hub is provided with an annular groove 12 in its inner surface over which is fastened a split ring 13 having a series of openings 14 through it, the ring being set in flush with the surface of the hub so as to present a smooth contour for the passage of fluid therethrough. The groove 12 with the split ring 13 which covers it forms a piezometer ring from which the pressure inside the hub is taken. The hub forms the central part of the throat of the flow tube and the pressure in the groove 12 is taken off through a hole 15, as shown in dotted lines in Fig. 2, which extends radially through the flange 10. Connected with one end of the hub is a funnel-shaped member 16 which forms the upstream end of the flow tube. The funnel-shaped member 16 is in the form of a nozzle and comprises a straight section 16$^a$, and a continuous reversely curved section 16$^b$ which terminates in an end section 16$^c$ which is parallel to the axial center line of the conduit. The end of the funnel is set into a groove or rabbet 17 in the hub so as to be flush with it and is fastened to it by rivets 18, having their heads set in recesses, as shown, so that a perfectly smooth interior surface is formed in the flow tube. Cored in the flange 10 just outside the hub 9 is a recess 19 which extends about three-fourths of the way around the hub, as indicated in dotted lines in Fig. 2, and this recess is connected by a series of pipes 20 with the large end of the funnel-shaped member 16. In the present instance four of these pipes are shown, and the hub 9 is provided with four bosses 21 having holes therein into which the pipes at one end are fastened, such holes being connected with the recess 19 through holes 22. The other ends of the pipes pass through holes in the large end of the funnel-shaped member 16 and have their ends flattened and fastened to the member 16 by rivets 23. The flattening of the tubes is such as to close the ends thereof, and they are each provided with one or more holes 24 through which the pressure existing in the large end of the funnel is taken off, and transmitted to the recess 19. In the flange 10 diametrically opposite the radial hole 15 is a radial hole 25 which connects with the recess 19 and through which the pressure therein is transmitted to the outside. It will be understood that the two radial holes 15 and 25 are connected by suitable piping to a manometer of some form which measures the difference in pressure existing between the up-stream end of the flow tube and the throat thereof, as is well known. Connected with the other end of the hub 9 is a funnel-shaped member 26 which forms the down-stream end of the flow tube and serves to gradually reconvert velocity into pressure as is well understood in connection with a Venturi tube.

As already stated, the two radial holes 15 and 25 are diametrically opposite each other, and when the flow tube is installed it is so positioned that such holes are horizontal so that the static heads on each side of the manometer to which the flow tube is connected will be the same. At 27 is a small opening connecting the recess 19 to the interior of the conduit the function of which is to drain any condensate from the pipes 20 when a condensable vapor is being metered and the flow tube is installed in a conduit which extends at an angle to the horizontal. Otherwise condensate would collect in such pipes 20 and unbalance the static heads. The opening, while it is sufficiently large to drain off such condensate, is not so large as to affect the pressure by permitting it to escape.

To install the flow tube it is only necessary to open the pipe line at one of its joints, insert the flow tube into place, and re-adjust the pipe coupling, clamping the flange 10 between the two parts of the coupling. It will be noted that it is unnecessary to make any openings through the pipe line as all the necessary connections are made with openings in the flange or collar 12.

The pipes 20 are flattened and closed at the ends so as to prevent the admission into them of dirt or other foreign matter which might be carried along by the flowing fluid and which might clog them up. There is little liability of any foreign matter getting in to the pipes 20 through the holes 24, since such holes face in a direction at right angles to the flow. The arrangement also acts to prevent any increase in pressure due to the dynamic head.

The operation of the flow tube is the same as that of an ordinary Venturi tube, and needs no explanation, it being understood that the leading pressure is taken off from the mouth of the flow tube by pipes 20, recess 19, and radial hole 25, and that the trailing pressure is taken off from the throat of the flow tube by holes 14, groove 12, and radial hole 15. Since a number of pipes 20 spaced around the conduit are used, an average of the pressures existing at spaced points in the conduit is obtained in the recess 19; this is likewise true of the pressure which exists in groove 12, since such groove is connected to the throat of the flow tube through a series of openings 14 spaced around the throat.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In a metering apparatus, the combination with a conduit formed of a plurality of pipe sections, of a flow tube located therein through which fluid to be metered flows, said flow tube comprising a throat section, means forming an annular groove surrounding the throat section and openings which connect the groove to the throat, a flange which surrounds the throat section and is clamped between adjacent pipe sections, said flange having a radial passage which connects with the said groove and an annular recess, a flared end section, means forming a passage which connects the region adjacent the flared end section to said annular recess, a second radial passage in said flange which connects with said recess, and leading and trailing pipes connected to said radial passages.

2. In a flow tube, the combination of a throat section having an annular groove in its inner surface, an annular flange surrounding the throat section and having a recess therein, flared end sections connected with the throat section, and a pipe connecting the region adjacent one of the flared end sections to the said recess, said flange having radial passages therein which connect with said annular groove and said recess.

3. In a flow tube, the combination of a throat section having an annular groove in its inner surface, an annular flange surrounding the throat section and having a recess therein, flared end sections connected with the throat section, and a pipe connecting the region adjacent one of the flared end sections to the said recess, said pipe having a closed end and a hole through it adjacent said end, and said flange having radial passages therein which connect with said annular groove and said recess.

4. In a flow tube, the combination of a throat section having an annular groove in its inner surface, an annular flange surrounding the throat section and having a recess therein, flared end sections connected with the throat section, a series of pipes spaced around the flow tube and connecting the region adjacent one of the flared end sections to said recess, said flange having radial passages therein which connect with said annular groove and said recess.

5. In a flow tube, the combination of a throat section having an annular groove in its inner surface, an annular flange surrounding the throat section and having a recess therein, flared end sections connected with the throat section, a series of pipes spaced around the flow tube and connecting the region adjacent one of the flared end sections to said recess, said pipes having closed ends and holes through them adjacent said ends, and said flange having radial passages therein which connect with said annular groove and said recess.

6. In a metering apparatus, the combination with a conduit formed of a plurality of pipe sections, of a flow tube located therein through which all the fluid to be metered flows, said flow tube comprising a throat section and a flared up-stream section, said flare comprising a continuous reverse curve whose ends terminate parallel to the axial center line of the conduit, a flange surrounding the throat section and clamped between adjacent pipe ends, said flange having outwardly opening passages therein, and means connecting said passages to the throat section and the up-stream section of said flow tube.

In witness whereof, I have hereunto set my hand this 21st day of June, 1916.

AUSTIN R. DODGE.